(12) United States Patent
Wilson

(10) Patent No.: US 7,225,243 B1
(45) Date of Patent: May 29, 2007

(54) DEVICE DISCOVERY METHODS AND SYSTEMS IMPLEMENTING THE SAME

(75) Inventor: Andrew W. Wilson, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 835 days.

(21) Appl. No.: 09/809,602

(22) Filed: Mar. 14, 2001

Related U.S. Application Data

(60) Provisional application No. 60/189,639, filed on Mar. 14, 2000.

(51) Int. Cl.
*G06F 15/173* (2006.01)
*H04L 9/00* (2006.01)

(52) U.S. Cl. .................................. 709/223; 713/163

(58) Field of Classification Search ............... 709/223, 709/204, 224; 713/163
See application file for complete search history.

(56) References Cited

U.S. PATENT DOCUMENTS

| | | | |
|---|---|---|---|
| 5,282,270 A * | 1/1994 | Oppenheimer et al. ..... | 709/223 |
| 5,400,325 A * | 3/1995 | Chatwani et al. ........... | 370/399 |
| 5,898,686 A * | 4/1999 | Virgile ....................... | 370/381 |
| 6,049,878 A * | 4/2000 | Caronni et al. ............. | 713/201 |
| 6,108,699 A * | 8/2000 | Moiin ......................... | 709/221 |
| 6,192,401 B1 * | 2/2001 | Modiri et al. ............... | 709/220 |
| 6,223,286 B1 * | 4/2001 | Hashimoto .................. | 713/178 |
| 6,272,113 B1 * | 8/2001 | McIntyre et al. ........... | 370/248 |
| 6,331,983 B1 * | 12/2001 | Haggerty et al. ........... | 370/400 |
| 6,337,863 B1 * | 1/2002 | Nair et al. ............. | 370/395.53 |
| 6,360,260 B1 * | 3/2002 | Compliment et al. ....... | 709/224 |
| 6,381,218 B1 * | 4/2002 | McIntyre et al. ........... | 370/245 |
| 6,457,059 B1 * | 9/2002 | Kobayashi ................... | 709/242 |
| 6,477,576 B2 * | 11/2002 | Angwin et al. ............. | 709/226 |
| 6,496,859 B2 * | 12/2002 | Roy et al. ................... | 709/223 |
| 6,507,586 B1 * | 1/2003 | Satran et al. ............... | 370/432 |
| 6,560,656 B1 * | 5/2003 | O'Sullivan et al. ......... | 709/250 |
| 6,567,851 B1 * | 5/2003 | Kobayashi ................... | 709/228 |
| 6,584,493 B1 * | 6/2003 | Butler ......................... | 709/204 |
| 6,625,652 B1 * | 9/2003 | Miller et al. ................ | 709/227 |
| 6,640,241 B1 * | 10/2003 | Ozzie et al. ................. | 709/204 |
| 2002/0075878 A1 * | 6/2002 | Lee et al. .................... | 370/401 |
| 2002/0133573 A1 * | 9/2002 | Matsuda et al. ............ | 709/220 |
| 2002/0174207 A1 * | 11/2002 | Battou ......................... | 709/223 |
| 2002/0196802 A1 * | 12/2002 | Sakov et al. ................ | 370/432 |
| 2005/0097317 A1 * | 5/2005 | Trostle et al. ............... | 713/163 |
| 2006/0002301 A1 * | 1/2006 | Liu et al. ..................... | 370/236 |

OTHER PUBLICATIONS

RFC 1112, "Request For Comments", Network Working Group, Aug. 1989.*
"Introduction to IP Multicast Routing", Vick Johnson, Marjory Johnson, Cisco, 1997.*

* cited by examiner

*Primary Examiner*—David Wiley
*Assistant Examiner*—J. Bret Dennison
(74) *Attorney, Agent, or Firm*—Martine Penilla & Gencarella, LLP

(57) ABSTRACT

A method for target device discovery on a network is disclosed. The method includes multicasting a signal from a master initiator over the network. A unicast is received from a new target recently connected to the network where the new target is passive when no multicast signal from the master initiator is received. Then the new target is added to a list of targets connected to the network. The method concludes by sending out a next multicast to other initiators where the next multicast includes information regarding the adding of the new target to the network.

25 Claims, 11 Drawing Sheets

DEVICE DISCOVERY METHODS AND SYSTEMS IMPLEMENTING THE SAME

CROSS REFERENCE TO RELATED APPLICATIONS

This application claims priority from U.S. Provisional Patent Application No. 60/189,639, filed Mar. 14, 2000, and entitled "ETHERNET STORAGE PROTOCOLS FOR COMPUTER NETWORKS." This application is also a continuation-in-part of co-pending U.S. patent application Ser. No. 09/490,630, filed Jan. 24, 2000, from which priority under 35 U.S.C. § 120 is claimed, and entitled "METHODS FOR IMPLEMENTING AN ETHERNET STORAGE PROTOCOL IN COMPUTER NETWORKS" which claims the benefit of U.S. Provisional Patent Application No. 60/117,226, filed Jan. 26, 1999, and entitled "SCSI OVER ETHERNET," and which also claims benefit of U.S. Provisional Patent Application No. 60/163,266, filed Nov. 3, 1999, and entitled "SCSI OVER ETHERNET." The aforementioned applications Nos. 60/189,639 and 09/490,630 are herein incorporated by reference.

BACKGROUND OF THE INVENTION

1. Field of the Invention

This invention relates generally to data communication, and more particularly to protocols for efficiently identifying peripheral devices on a network while reducing data congestion and decreasing device recognition time on the network.

2. Description of the Related Art

The art of networking computers has evolved over the years to bring computer users a rich communication and data sharing experience. Typically, in a network, numerous devices may be connected to a computer to maximize computing power and efficiency. As is well known, new levels of sophisticated communication technologies enable users to share information across both large and small networks. Most of the world's computers communicate via computer networks by communicating data from one node to another node utilizing various data transport protocols. One typical type of protocol utilizing networks for data transmission is TCP/IP. TCP/IP is a set of protocols developed to allow cooperating computers to share resources across a network. TCP (the "transmission control protocol") is responsible for breaking up a message into variable length segments, reassembling them at the other end, resending anything that gets lost, and putting things back in the right order. IP (the "internet protocol") is responsible for routing individual segments. Utilizing such protocols as IP, computer networks may transfer data from one node to another.

As a high level overview, take an exemplary data file that is selected for communication over a network using the TCP protocol. Initially, the TCP protocol will break up the data file into a plurality of variable length segments. Each variable length segment is then packaged with an associated TCP header. An IP header will also be added to the beginning of the packet. The packets are now transmitted over the network, where each packet may potentially travel a different path (e.g., through a plurality of routers and the like) in their journey to a destination. At the destination, the TCP protocol is charged with receiving the packets.

For example, TCP/IP may be utilized in a data storage network for the sending and receiving of data with a SCSI host adapter and a typical NIC. To do this, network interface cards (NICs) with initiators are often utilized to communicate data and peripheral device information throughout the network. NICs may generally connect a computer or other type of node to a network. NICs are typically a circuit, an ASIC, or a host adaptor card that are often utilized in Ethernet or token ring networks. Initiators generally are located within a NIC and originates an input/output command over a network, bus, etc.

Unlike general communication networks, which assume that all attached devices are peers and that any given device will want to communicate with only a small subset of other devices, storage networks are hierarchical, with a few initiators in communication with many targets, and with targets in communication only with initiators, or with other targets under the control of an initiator. Typically, this storage viewpoint requires that initiators be able to locate all the targets, and be able to communicate with many or all of them.

Problematically, present methods to manage and determine the peripheral devices connected to the network have high data transmission overhead and often requires an additional directory agent to keep track of all of the peripheral devices. In addition, frequent use of broadcasting in the prior art can cause congestion in switch based networks. Typically large networks have many targets and numerous initiators. In addition, large networks have a directory that is generally set up by network administrators. Large networks also generally require a network administrator to assign IP addresses to devices on the network so a directory agent may keep track of them. Furthermore, in the process of setting up directories, network administrators must often decide on the scope of each directory such as geographic extent or types of devices. In such a configuration, targets may register their existence and addresses with the directory agent, and initiators or hosts may then communicate with the directory agent and poll all of the targets to determine the existence of every peripheral device connected to the network. Therefore, every initiator generally polls all directory agents at certain intervals to determine the target connection. This arrangement can cause data transfer congestion. Unfortunately frequent polling generally occurs in an attempt to obtain quick discovery of targets, but the resulting network congestion can create the degradation of target discovery and reduction in the speed of target recognition due to packet dropping. Consequently, polling occasionally means new devices take a long time to be "found" by the initiators.

For example, although new targets will often broadcast a signal to state to the network that it exists and is connected to the network, if a directory is present, as is usually the case in large networks, the directory registers the device and it will only broadcast once. This may be good for bandwidth, but also means that some initiators may not "see" the target's broadcast (dropped packets) so even if they are listening for such broadcasts to find out if a new target has joined the network, they tend to miss its joining and will not find out till they are polled. Therefore, target recognition speed may be severely hampered, and in some circumstances, target recognition may not occur.

Unfortunately, in small networks, directory agents are generally not utilized so all of the initiators on the network tend to poll extremely often so they can find all of the targets on the network. Regrettably, such numerous pollings create excess data traffic on the network and therefore decrease available bandwidth. Furthermore, targets themselves attempt to broadcast that they are connected onto the network thereby increasing data congestion even more. In addition, because small networks typically do not have a network administrator who can perform tasks such as, for example, assigning IP addresses to targets, such networks do not generally operate in a centralized and organized manner because there is no entity to assist in the organization and centralization of network connections and configurations. Even medium size systems tend to need directories to keep the initiator polling overhead from getting too large which entails once again to have a network administrator to look over the network.

For example, at startup of a small network, initiators typically broadcasts a query of all of the targets to determine what devices may be connected to the network. At the same time, targets may broadcast signals throughout the network in an attempt to notify initiators of their existence. In such a configuration, initiators generally broadcasts signals to communicate with the targets. Once again, this creates excess data transmissions and network congestion. Therefore, in typical peripheral device discovery, the network becomes congested with the initiators and targets all trying to communicate to each other without any sort of organization. In essence, initiators and targets are involved in a "free for all" in an attempt to communicate with each other. This results in excessive data transmission and dramatically lowers the network's ability to transmit data.

Furthermore, when a new target such as a peripheral device is added to a network, the peripheral device generally sends a broadcast signal throughout the network indicating that the peripheral device is connected to the network. By the broadcast signal, the peripheral device communicates its existence to all of the initiators located on the network. Unfortunately, in a typical network, when a target such as a peripheral de ice is attached, the signal broadcasted throughout the network creates data traffic within the network thus slowing down data being transferred between the other peripheral devices and an initiator. This problem becomes progressively worse as multiple targets are added to the network. In addition, broadcasts may not reach all of the initiators due to congestion caused packet drops. Thus, some initiators may not find out about the new devices for quite some time thus detrimentally contributing to lengthened device recognition times.

In view of the foregoing, there is a need for a target discovery and management protocol that removes the data congestion produced by prior art device discovery protocols. There is also a need for an initiator recognition protocol that is optimized for storage and enables fast and efficient utilization in local area networks, wide area networks, and over the Internet.

SUMMARY OF THE INVENTION

Broadly speaking, the present invention fills these needs by providing a data transmission and target device discovery system that centralizes and streamlines the processing and communication of device data and reduces the data communication congestion and device discovery slowdown associated with prior art device discovery techniques. Although different names are used for identification purposes, it should be understood that the technical implementations remain the same. It should be appreciated that the present invention can be implemented in numerous ways, including as a process, an apparatus, a system, a device, a method, or a computer readable medium. Several inventive embodiments of the present invention are described below.

A method for target device discovery on a network is disclosed. In this embodiment, the method includes multicasting a signal from a master initiator over the network. A unicast is received from a new target recently connected to the network where the new target is passive when no multicast signal from the master initiator is received. Then the new target is added to a list of targets connected to the network. The method concludes by sending out a next multicast to other initiators where the next multicast includes information regarding the adding of the new target to the network.

In another embodiment, a method for target device discovery on a network is disclosed. In this embodiment, the method includes multicasting a signal from a master initiator over the network. Then it is determined if a previously registered target re-registered with the master initiator by a unicast to the master initiator. The method also includes maintaining the previously registered target on a list of active targets connected to the network. The method further includes sending out a next multicast with information regarding the previously registered target to notify other initiators to maintain the previously registered target on the list of targets.

In yet another embodiment, a method for target device discovery on a network is disclosed. In this embodiment, a master initiator includes program instructions for multicasting a signal over the network where the multicasting is triggered continually at a predetermined interval, and for receiving a unicast from a new target recently connected to the network where the new target is passive and waits for a multicast signal from a master initiator. The master initiator further includes program instructions for adding the new target to a list of targets where the adding occurring in response to the directed unicast signal, and for determining if a previously registered target re-registered with the master initiator. The master initiator includes additional program instructions for maintaining the previously registered target on the list of targets where the multicasting transmits information regarding the maintaining and the adding of targets to the network.

In another embodiment, a system for target device discovery on a network is disclosed. In this embodiment, the system includes a master initiator where the master initiator sends a multicast throughout the network. The system also includes at least one target where the at least one target remains passive until a multicast is received from the master initiator. The system further includes at least one slave initiator where the at least one slave initiator receives target information from the multicast. In addition, the master initiator polls the at least one target by way of the multicast, and the at least one target responds to the multicast through use of a unicast directed to the master initiator.

The advantages of the present invention are numerous. By having discovery protocols and methods that intelligently centralize target device information reception and dissemination, excess data communication over a network may be reduced dramatically. Such a reduction in data communication congestion, enables the network to perform at an optimum efficiency by freeing up data transmission bandwidth. In addition, the present invention enables selecting of a master initiator that may facilitate the centralization and data congestion reduction process. Specifically, information and data regarding network targets may be piggybacked on multicasts from the master initiator that is usually sent for initiator identification purposes. Therefore, the network data or the network update data that are multicasted from the master initiator reduces great amounts of congestion in comparison to the prior art method where all of the initiators and targets attempt to communicate with each other on a one on one basis. In yet another advantage, unlike prior art system, the present invention may more quickly recognize a new target as being on the network therefore decreasing effective discovery time. As can be seen, the present invention reduces data congestion in a powerful but elegant manner, and advantageously enables an organized and centralized peripheral device discovery process.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Figure 1:
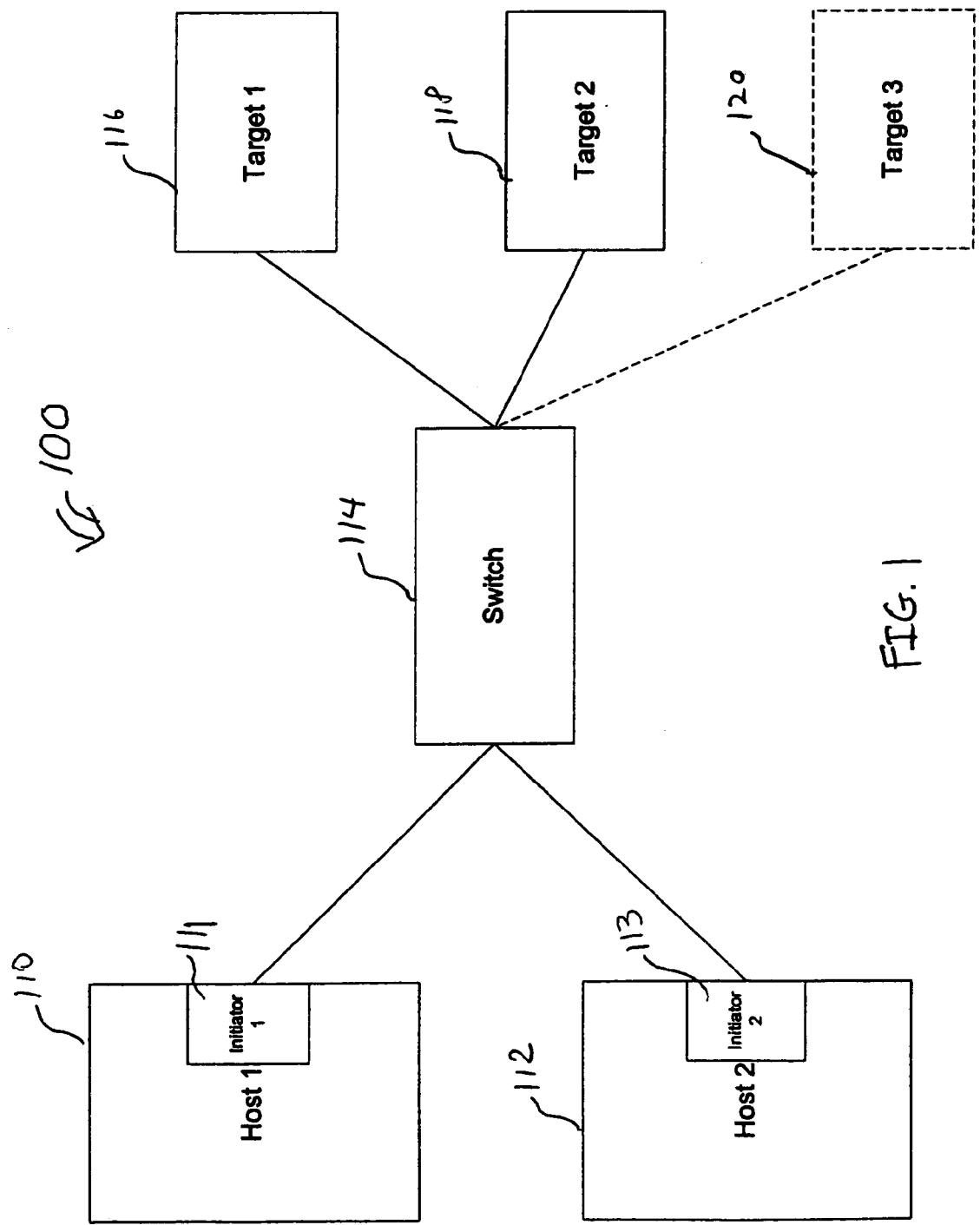
FIG. 1 shows a network utilizing data transmission and network management methods in accordance with one embodiment of the present invention.

An invention is described for a system for centralized network communication control and efficient but quick peripheral device discovery in a network environment. The peripheral device discovery system may also be known as peripheral discovery protocol (PDP). It should be understood that the method of the present invention may work in any type of network environment utilizing any type of data transfer protocol where data is transferred and where data congestion over a network is preferably lowered and target discovery time is reduced. Examples of such networks include, for example, Ethernet, token ring, or other networks with multicast capabilities. Examples of such data transmission protocols include, for example, TCP/IP, small transport protocol (STP) as described in U.S. patent application Ser. No. 09/490,630, entitled "Methods For Implementing An Ethernet Storage Protocol In Computer Networks," etc. The aforementioned patent application is incorporated herein by reference.

A network utilizing the methods of the present invention will preferably include host computers equipped with hardware to enable communication using a transport protocol such as a TCP/IP over a network with multiple initiators and targets which would benefit from a reduction in data transfer congestion and inefficiencies associated with the prior art data transmission systems. In one embodiment, a network utilizing IP with the initiator-target communications system of the present invention will enable more efficient transfers of data over a communication link such as a local area network (LAN) by reducing unnecessary data transfer congestion resulting from inefficient network component management. In another embodiment, larger networks, such as the Internet with the additional implementation of the Internet Protocol (IP) may benefit from the present invention by reducing unneeded data communications overhead. Consequently, a flexible and efficient management of initiators in device discovery may be utilized on a local environment or over IP in a large network to reduce unneeded data traffic over any system.

In one embodiment, the present invention may be utilized by network interface cards (NICs) such as, for example, storage optimized or accelerating NICs and may be utilized within Ethernet systems or over TCP/IP for communication on a network to a desired target. The target, therefore, is preferably a storage target, such as a hard disk, a RAID array, a CD media device, a storage box, a network attached storage (NAS), or other peripheral device that can store and exchange data. It should be understood that the present invention may be utilized to find any network resource, such as, for example, printers, modems, etc. Such a target may be intelligently detected by a "master initiator" within a particular NIC which can map network target connections for use by other initiators within other NICs on the network. Therefore, other initiators do not have to individually poll the targets to ascertain what targets may be connected to the network thus cutting down the data traffic that often occurs. This reduction in traffic consequently enables more efficient data transfer within the network. In addition, targets that may be connected on a remote part of the network may be discovered more quickly than in prior art methods.

It will be obvious, however, to one skilled in the art, that the present invention may be practiced without some or all of these specific details. In other instances, well known process operations have not been described in detail in order not to unnecessarily obscure the present invention.

FIG. 1 shows a network 100 utilizing data transmission and peripheral device discovery methods in accordance with one embodiment of the present invention. In this embodiment, a host-1 110 and a host-2 112 are connected to each other and to a target-1 116 and a target-2 118 by way of a switch 114. It should be understood that the hosts 110 and 112 may include any type of NIC such as, for example, storage optimized or accelerating NICs. The host-1 110 includes an initiator 111 and the host-2 112 includes an initiator 113. In one embodiment, the initiators 111 and 113 manage target connectivity information and acts as an input/ output manager for the hosts 110 and 112 thus regulating input and output from the hosts 110 and 112 to the network 100. It should be understood that the network 100 is only one embodiment and other types of networks with any number of initiators, targets, switches, and typical network components may benefit from the network management methods of the present invention.

In one embodiment, at power up, the initiators attempt to first determine which initiator is the master initiator. In this circumstance, as discussed in more detail in reference to FIGS. 2A–2C and 13, initiators send multicast signals out to the network. Multicast signals are signals that do not go just to a specific destination but go to all nodes within the network 100. In one exemplary embodiment of a master initiator selection process, the initiator-2 113 receives a multicast-1 from the initiator-1 111 while the initiator-1 111 receives a multicast-2 from the initiator-2 113. The multicast-1 and the multicast-2 signals are master initiator signals without the master initiator bit being set. The master initiator bit is set when a master initiator has been determined. Thereafter, all multicasts sent by the master initiator resulting from the selection process has the master initiator bit set. It should be appreciated that any way of indicating that the master initiator signal is from the master initiator may be utilized. In one embodiment, a real_master flag is set in a master initiator multicast signal which identifies the master initiator and notifies other initiators that the master initiator already exists.

If multicasts are sent by two initiators and neither master initiator signal has a master initiator bit that is set (meaning neither has been selected as the master initiator yet), each of the initiators 111 and 113 compares the global unique identification number (GUID) number of the other initiator with its own GUID number. It should be understood that any unique identifier could be used in the present invention such as, for example, MAC address, EUI-64 numbers, or any other Globally Unique Identifiers. Each of the master initiator signals include a GUID number identifying the initiators. It should be understood that any other type of identification may be utilized to determine the master initiator as long as the identification process is a logical and consistent method. In one embodiment, the initiator with the higher GUID number (or in the case of more than 2 initiators, the highest GUID number) becomes the master initiator.

In one embodiment, the initiator-1 111 has the higher GUID number and becomes the master initiator. In this circumstance, the intiator-1 111 multicasts a master initiator signal with the master initiator bit that is set. It should be understood that the master initiator signal may be sent out in any time interval that enable adequate monitoring of targets that is connected to the system. In one embodiment, the master initiator signal with the master initiator bit set is multicasted once every second. When the master initiator bit is set, all the other initiator(s) connected with the network knows that a master initiator exists on the network. The master initiator signals (with, in one embodiment, the real_initiator flag) all targets (i.e. peripheral devices) that the initiator-1 is the master initiator and is connected to the network. In one embodiment, in contrast to prior art systems, the targets do not respond until they receive a master initiator signal with the master initiator bit set. In this circumstance, each target knows that a particular initiator (such as initiator-1) is the master initiator and it should unicast a data transmission to the master initiator so the master initiator may find out that the target is on the network. As opposed to a multicast, a unicast is a data transmission message directed to one recipient. When the unicast from a target is received by the master initiator, information regarding the target is added to a list of targets maintained by the master initiator. Therefore, as opposed to the prior art where the target multicasted its information throughout the network, the target in this embodiment only responds to one master initiator which lowers data transmission congestion significantly. Additionally, in one embodiment, when the master initiator next multicasts a master initiator signal over the network, the new target information is included in the multicast and the other initiators on the network will add the target information to their target lists.

In another embodiment, when a target-3 120 is connected to the network 100, the target-3 120 awaits reception of a multicasted master initiator signal from the initiator-1 111. Once the master initiator signal with the master initiator bit set is received, the target-3 120 sends a unicast response back to the initiator-1 111 stating its existence and location (i.e. address). Therefore, through the feedback from the targets in response to the master initiator signal, the initiator-1 111 (the master initiator) knows that the targets 116, 118, 120 are connected to the network 100. Then, in one embodiment, as discussed below in further detail in reference to FIG. 3, the initiator sends out multicast signals including data showing the master initiator signal sequence number and the targets that have responded to the master initiator since the last master initiator signal was sent out. Therefore, in one embodiment, if the intiator-1 111 has sent out 3 types of master initiator signals (with sequence number ranging from 1–3, a new sequence number being assigned when new target information is included), and before the next master initiator signal is sent out, the master initiator receives a unicast from the just added target-3 120 showing that the target-3 120 is attached to the network. Then, the initiator-1 111 sends out a fourth multicast signal that has a sequence number of 4 with the master initiator bit set that includes new target data showing that the target-3 120 is connected to the network. This way other targets and initiators may know that the target-3 120 exists and is connected to the network 100.

By using a master initiator sequence number of 4 for the fourth type of multicast signal, the other initiators may know that there were three previous types of master initiator signals with certain target data information. In one embodiment, the master initiator signal sequence number is changed only when a new development in the network occurs such as when a new target is found or an old target checks in the master initiator. In this embodiment, the master initiator keeps sending out master initiator signals that indicates to the targets that a master initiator exists and any signals showing a target's connection to the network should be sent to the master initiator.

Figure 2A:
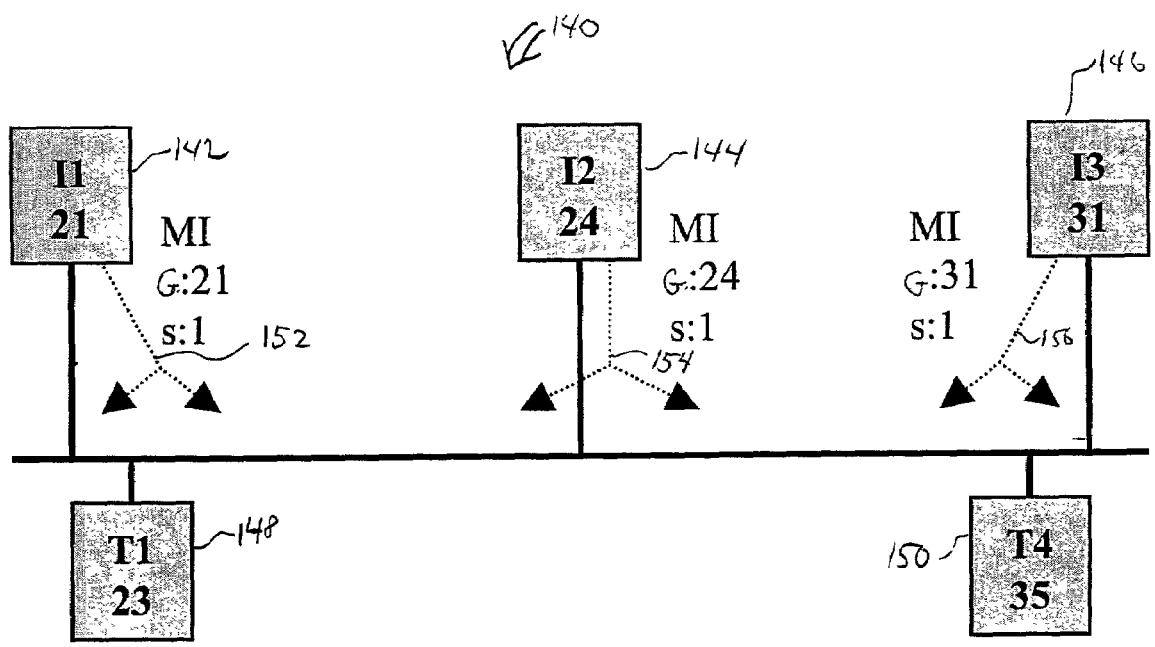
FIG. 2A shows a network that illustrates a master initiator selection process in accordance with one embodiment of the present invention.

FIG. 2A shows a network 140 that illustrates a master initiator selection process in accordance with one embodiment of the present invention. In this embodiment, an initiator-142, an initiator-2 144, and an initiator-3 146 are part of a network that also includes a target-1 148 and a target-4 150. In this embodiment, the initiator-1 142 sends out a master initiator signal 152 that has a global unique identification (GUID) number of 21 and a sequence number of 1 while the initiator-2 144 sends out a master initiator signal 154 with a GUID number of 24, and the initiator-3

146 sends out a master initiator signal 156 with a GUID number of 31. It should be understood that GUID numbers have numerous alphanumeric digits such as letters and numbers, and two digit numbers are utilized here as only as one embodiment and for ease of description.

In this exemplary embodiment, the sequence number of 1 shows that the master initiator signal is the first type of signal sent out by the respective initiators. In one embodiment, the sequence number only changes when new information is received from a target. In one embodiment, the GUID numbers of the initiators 142, 144, and 146 are compared, and the initiator with the highest GUID number becomes the master initiator. It should be appreciated that any way of sorting the GUID number to determine the master initiator may be utilized such as for example, making the lowest GUID numbered initiator into the master initiator. Therefore, in this exemplary embodiment, the initiator-3 146 becomes the master initiator because it has the highest GUID number.

Figure 2B:
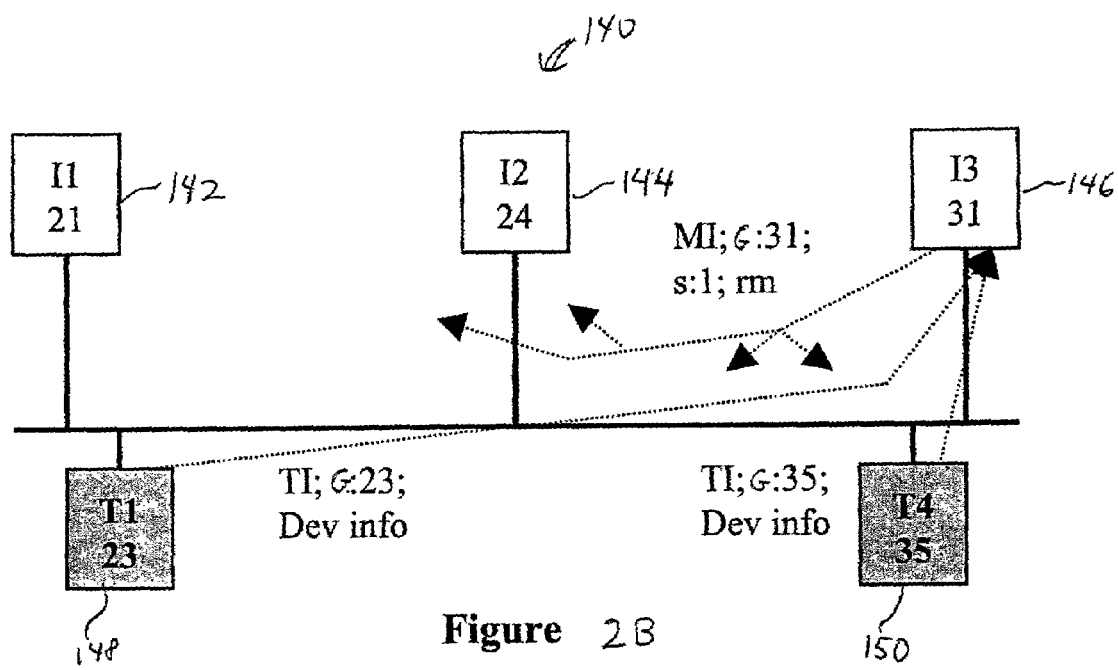
FIG. 2B illustrates the network after a master initiator has been determined in accordance with one embodiment of the present invention.

FIG. 2B illustrates the network 140 after a master initiator has been determined in accordance with one embodiment of the present invention. In this embodiment, the initiator-3 146 has become the master initiator (as described in reference to FIG. 2A) and therefore multicasts master initiator signals with the master initiator bit set (e.g., with a real_master flag set). This multicast notifies all devices or components attached to the network that the initiator-3 146 is the master initiator and all targets, or after startup, new targets, should unicast a signal to the master initiator so the target may be acknowledged as connected to the network. It should be understood that there may be any number of initiators and targets that the master initiator communicates with. By multicasting the real master initiator signal to all of the initiators and targets, all components connected to the network may know that the initiator-3 146 is the master initiator and also know the status of the network with regard to device connection. It should be understood that the master initiator bit (such as, for example, a real_master flag) may contain any type of data that may notify other components on the network about important network configuration or status information. In this embodiment, the target 148 and the target 150 both respond to the master initiator's real master initiator signal in the form of a target unicast 158 and a target unicast 160 respectively.

The target unicasts 158 and 160 that are utilized to respond to the master initiator may also be known, in one embodiment, as a target identify packet. It should be understood that the target unicasts 158 and 160 may contain any type of information about a target. In one embodiment, both of the target unicasts 158 and 160 include information regarding the address of the targets. In another embodiment, the target receives a master initiator signal with the real_master flag and is instructed to re-register with the master initiator in a set interval of time so the master initiator knows that it is still connected to the network. In one embodiment, the re-register interval time is 10 minutes. If the target does not re-register within the set interval of time, the initiator assumes that the target is no longer connected to the network. Because, the slave initiators also receive the multicast with the re-register interval information, the slave initiators will also assume that the target has disconnected if a target re-registration is not indicated in a master initiator multicast.

After the target unicasts 158 and 160 are received, the master initiator resets its own target tables and prepares to transfer target information to the initiators 142 and 144 which in this embodiment are slave initiators. The target tables may contain any type of target information such as, for example, target address, device type, etc. When the slave initiators receive the next multicast from the master initiator and receive the update regarding the re-registration, the slave initiators will also reset their target tables and maintain the target on the target list.

Figure 2C:
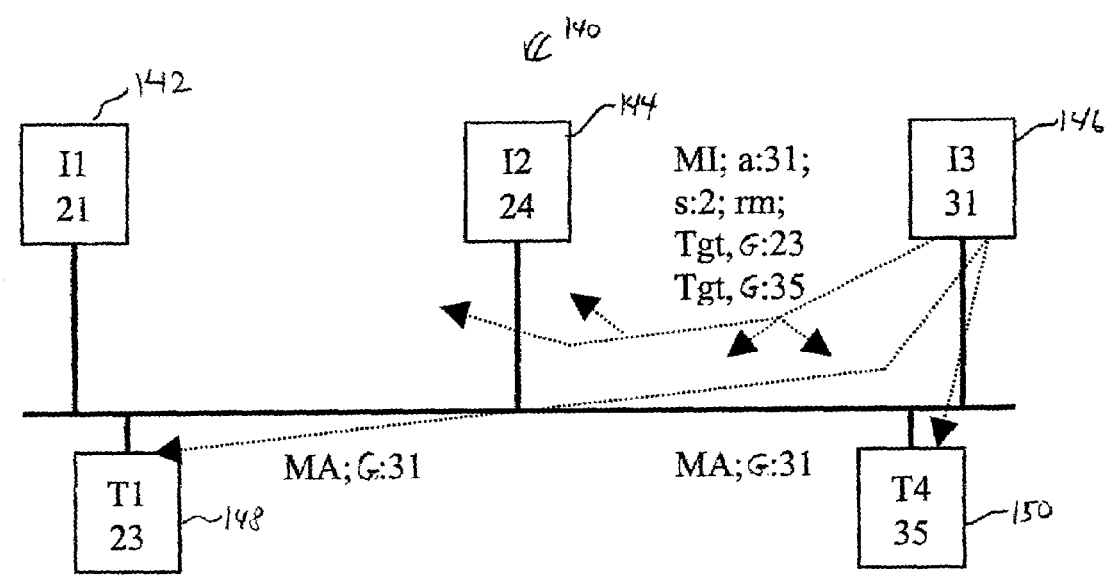
FIG. 2C shows a network where a master initiator is multicasting a master initiator signal in accordance with one embodiment of the present invention.

FIG. 2C shows a network 140 where a master initiator is multicasting a master initiator signal in accordance with one embodiment of the present invention. In this embodiment, the initiator-3 146 is already a master initiator and is multicasting a second sequence (sequence number is 2) master initiator signal to a intiator-1 142, a initiator-2 144, a target 148, and a target 150. The master initiator signal with a sequence number of two is broadcasted after the master initiator has received target information data from the targets as described in reference to FIG. 2B. Once the target tables containing data and address information about the targets 148 and 150 are updated, the target information for the targets 148 and 150 is incorporated into the master initiator signal. Because data in the original master initiator signal (with a sequence number of 1) is updated, the new master initiator signal is given a sequence number of 2. Therefore, in this manner, the master initiator may broadcast data about the targets 148 and 150 that are connected to the network to the initiators 142 and 144 with one multicast. Such a multicast reduces congestion on the network because extra data being transmitted from a target to all initiators is reduced and one multicast signal from the master initiator notifies all of the nodes on the network about the devices connected to the system.

Figure 3:
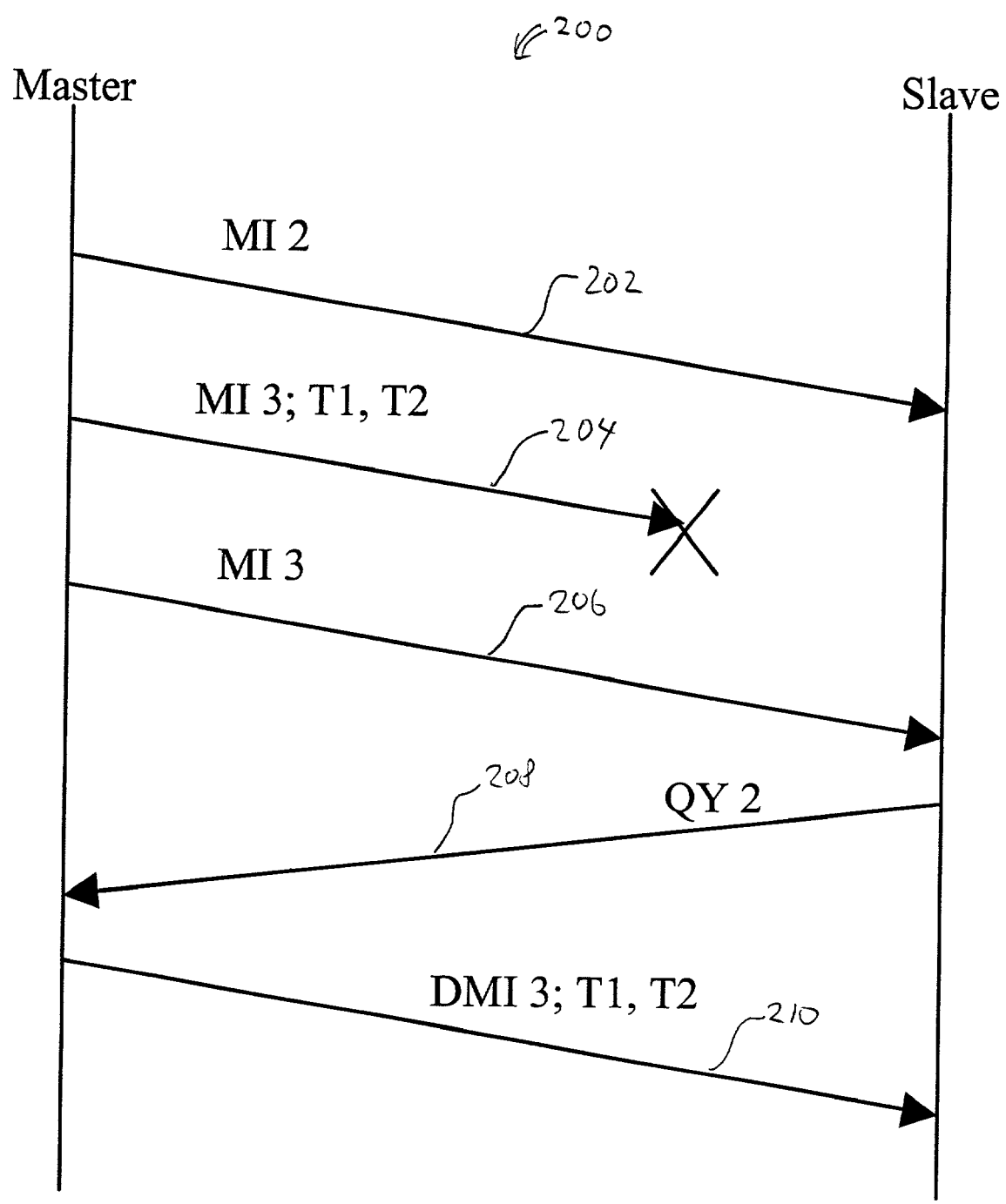
FIG. 3 shows a diagram where one of a plurality of initiators detects a missed master initiator signal in accordance with one embodiment of the present invention.

FIG. 3 shows a diagram 200 where one of a plurality of initiators detects a missed master initiator signal in accordance with one embodiment of the present invention. In this embodiment, a master initiator signal 204 with a sequence number of 3 was missed by a slave initiator. The slave initiator knows that it missed the master initiator signal 204 because it successfully received a master initiator signal 202 with a sequence number 2 with new target data, but it received a master initiator signal 206 with a sequence number of 3 without new target data. Because there should be corresponding new target data every time a master initiator signal with a new sequence number is received with the signal, the slave initiator knows that is has missed some sort of new network or target.

Therefore, the slave initiator notifies the master initiator that it did not receive the master signal with the sequence number of 3 by way of a query packet. The query packet is described in more detail in reference to FIG. 12. When the master initiator receives the query packet, it resends the particular master initiator signal (as determined by the sequence number) that was missed. Therefore, slave initiators may use the sequence number to determine if it has received all of the target data updates from the master initiator. If there is a missing sequence number, the slave initiator knows that it must request a resend of the master initiator signal with the missing sequence number. The missing data is unicasted to only the slave initiator that missed the previously sequenced master initiator signal and a response from the master initiator will also be in the form of a unicast to cut down on excess data traffic over the network. In this way, the present invention may intelligently and powerfully reduce data transmission congestion in a network and therefore increase data transfer efficiencies of needed traffic.

Figure 4:
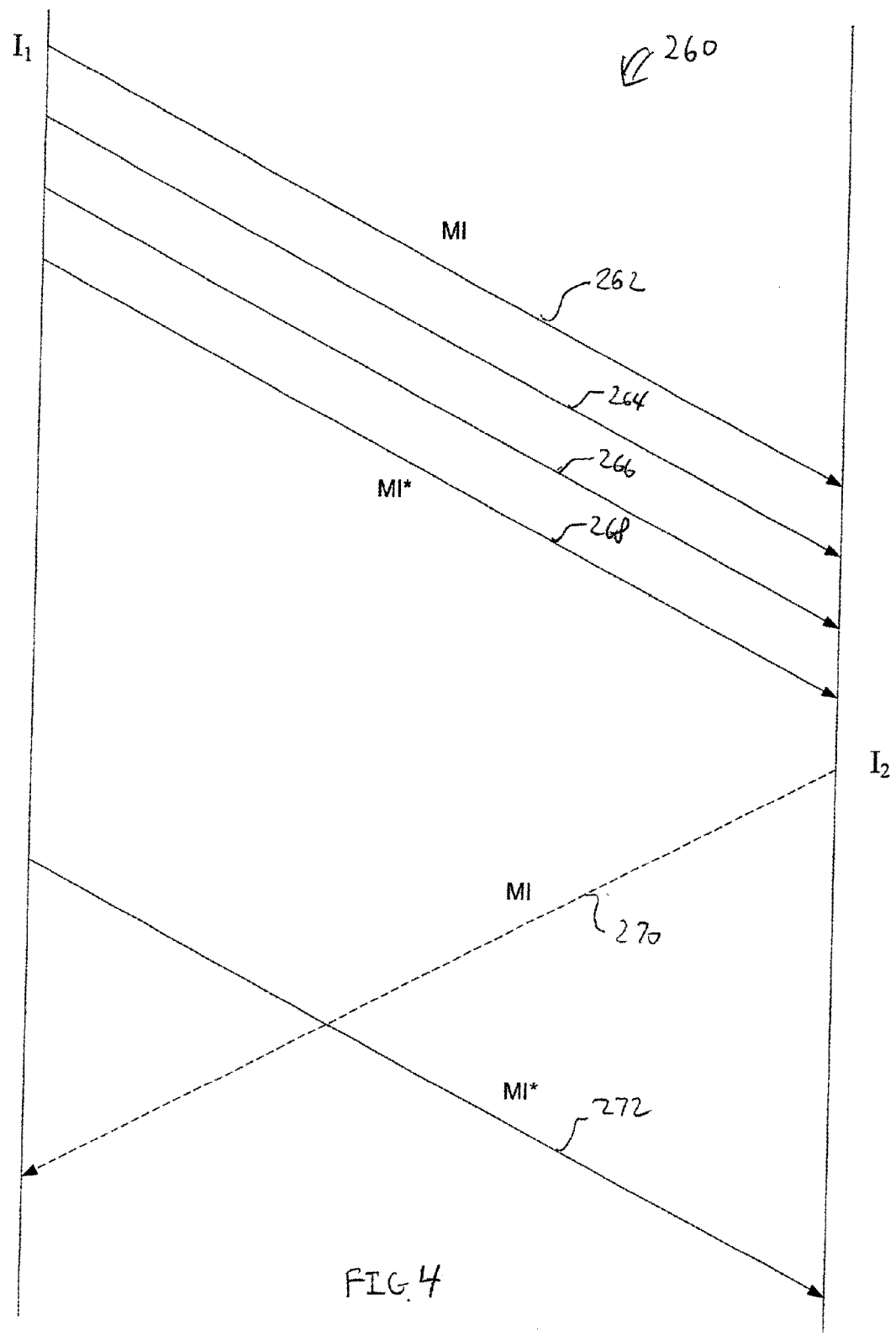
FIG. 4 shows a graph where a second initiator is connected to the network after a first initiator has been established as a master initiator in accordance with one embodiment of the present invention.

FIG. 4 shows a graph 260 where a second initiator is connected to the network after a first initiator has been established as a master initiator in accordance with one embodiment of the present invention. In this embodiment, the first initiator multicasts a first master initiator signal 262 without a master initiator bit set. Because there are no other initiators connected to the network, the first initiator does not detect any other master initiator signals than its own. The first initiator then multicasts a second master initiator signal 264, and still does not detect other master initiator signals. The first initiator then multicasts a third master initiator signal 266. Again, the first initiator does not detect the presence of another initiator because no other master initiator signals besides its own is detected. Finally, at this time, the first initiator proclaims itself as the master initiator and multicasts a master initiator signal 268 with a master initiator bit set (as denoted by MI*). In one embodiment, the master initiator bit is a real_initiator flag. It should be appreciated that the first initiator may send out any number of master initiator multicasts before proclaiming itself as the master initiator as long as the first initiator multicasts enough times to be able to accurately determine that there is no other initiators connected to the network.

In one embodiment, then a second initiator is attached to the network. As soon as the second initiator is connected, it multicasts out a master initiator signal 270 without a master initiator bit set. At this time, the second initiator detects a master initiator signal 272 from the master initiator that has the master initiator bit set indicating that a master initiator already exists. In this circumstance, the second initiator becomes a slave initiator.

FIGS. 5 through 12 disclose exemplary types of packets that may be utilized in peripheral device discovery (PDD). Although some of the functionality of the packets is described in terms of SCSI specification, the packets may be organized differently or have some different components as long as the packets may operate in accordance with the disclosed methods as described in reference to FIGS. 1–4 and 13.

Figure 5:
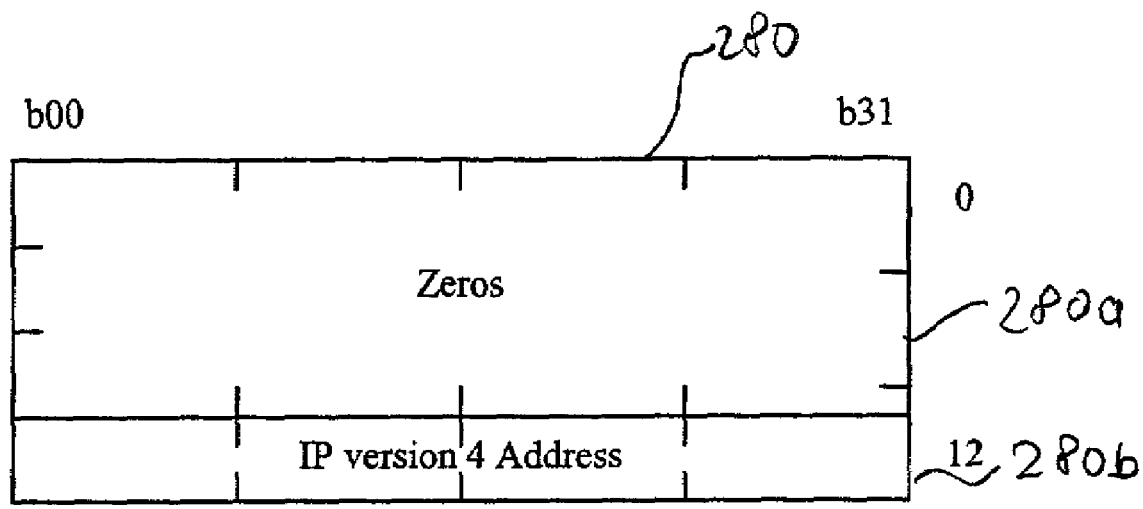
FIG. 5 shows a discovery protocol data structure containing an IP version 4 address in accordance with one embodiment of the present invention.

FIG. 5 shows a discovery protocol data structure 280 containing an IP version 4 address in accordance with one embodiment of the present invention. It should be appreciated that the discovery protocol data structure 280 may also be utilized for other types of addresses such as, for example, an IP version 6 address. In one embodiment, initiators and targets within a network utilizing internet protocol (IP) may effectively use the data transmission congestion reduction method of the present invention to detect peripheral devices without creating undue traffic congestion. In one embodiment, the present invention may be utilized over IP in an automatic fashion where the master initiator would use Dynamic Host Configuration Protocol (DHCP) to obtain local IP information, and pass it on to the other devices on the subnet. In this embodiment, IP addresses may be utilized to share information between local master initiators. The sharing could be via a global master initiator, or by more of a peer to peer protocol. Preferably, a master initiator is selective about what devices are published to the global space, so as to keep down the amount of traffic, and keep many local devices private.

In one embodiment of the protocol of the present invention, each of the peripheral discovery protocol (PDP) messages (i.e., master identify, target identify, master ACK, and query) may have a sixteen byte device ID field such as a four byte IP version 4 address 280b. The field may contain either the four byte IP version 4 address or a sixteen bit IP version 6 address as shown in reference to FIG. 6 below. In one embodiment, the type of address included may be determined by flag bits right justified in a standard flag field elsewhere in the specific message as shown below:

| 0x0001 | PDP_IP_0 |
| 0x0002 | PDP_IP_1 |

Together these bits indicate which version of IP address is included, if any. The following combinations are supported:

| 00 | Ethernet Address or no assigned IP address |
| 01 | IP version 4 address |
| 10 | IP version 6 address |
| 11 | Future IP version address |

In one embodiment, the type of address in the discovery protocol data structure 280 may include data full of zeros 280a and an IP version 4 address 280b. By use of the IP version 4 address 280b, the targets and initiators in a network may be intelligently identified and located.

Figure 6:
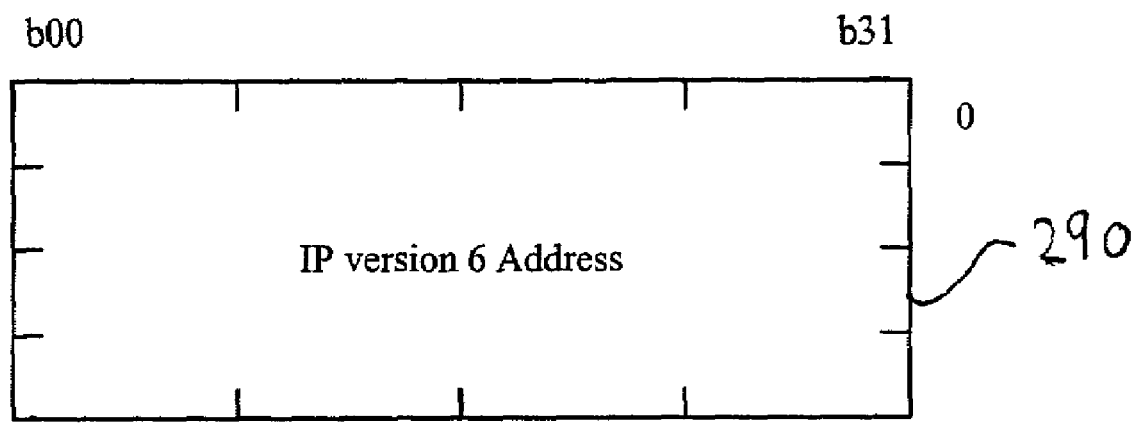
FIG. 6 shows a discovery protocol data structure containing an IP version 6 address in accordance with one embodiment of the present invention.

FIG. 6 shows a discovery protocol data structure 290 containing an IP version 6 address in accordance with one embodiment of the present invention. It should be appreciated that the discovery protocol data structure 290 may also be utilized for other types of addresses such as, for example, an IP version 4 address. In this embodiment, the discovery protocol data structure 290 contains 16 bytes of IP version 6 address.

Figure 7:
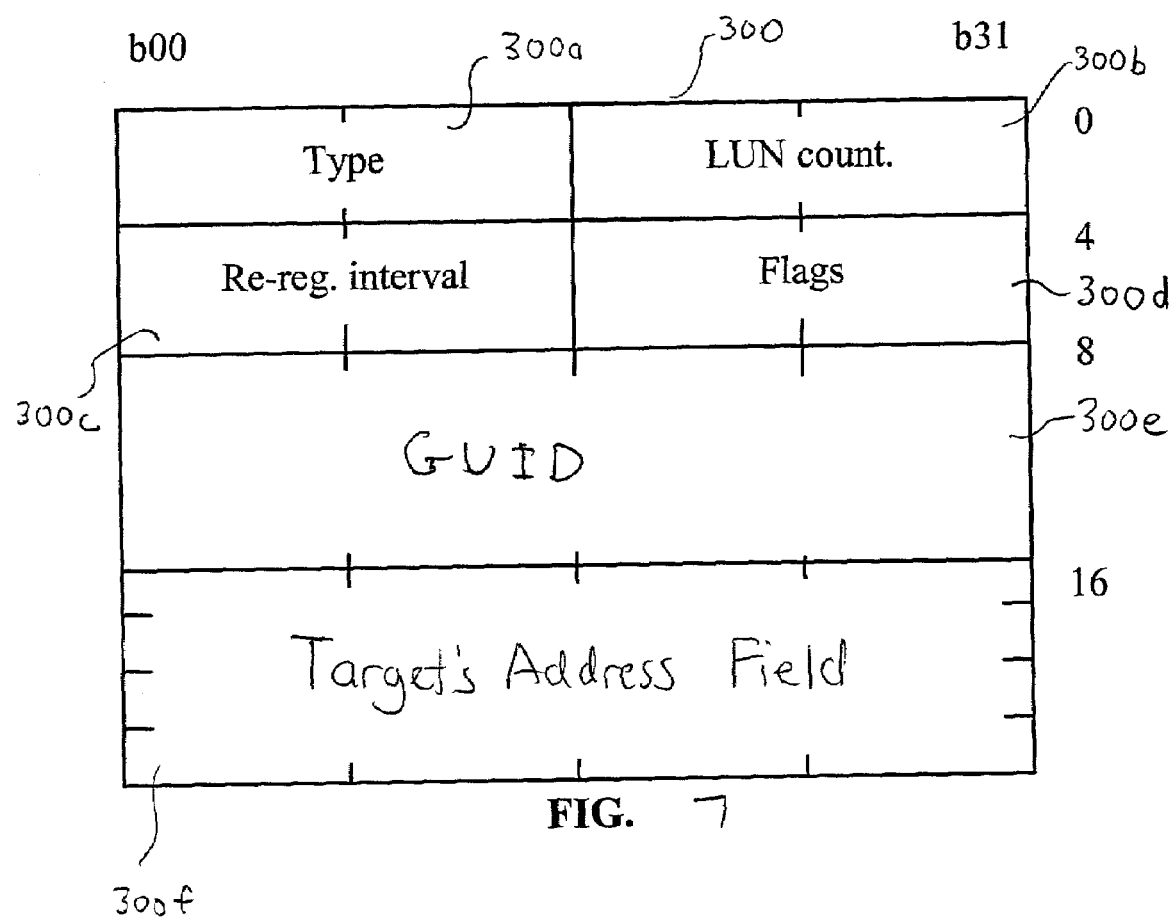
FIG. 7 illustrates a target information field that may be utilized by peripheral device discovery packets in accordance with one embodiment of the present invention.

FIG. 7 illustrates a target information field 300 that may be utilized by peripheral device discovery packets in accordance with one embodiment of the present invention. It should be understood that any type or format of field containing target information may be utilized as long as the field is coherent, organized, and contains the needed information in a format acceptable to device discovery protocol. It should also be understood that the target information field 300 may be utilized in any peripheral discovery packet that is utilized by an initiator and/or target. In one embodiment, master identify and target identify packets utilize and/or incorporate the target information field 300. As discussed above, the master identify packet, in one embodiment, is multicasted and may be utilized to identify the master initiator as an initiator to any receiving targets and supply the initiator's IP address (or any other type of address depending on the transmission protocol). The target identify packet, in one embodiment, is unicasted from a target to the master initiator in response to a master identify packet and may include device information such as, for example, device type and device address. The target information field may also include data such as Ethernet addresses, IP address, target LUN count, target type, and other information about target capabilities. In one embodiment, the size of the type field 300a is fixed to simplify implementation, but the IP address fields may be empty if IP headers are not being used.

Additionally, in one embodiment, the target information field 300 contains a GUID which is a number that can serve to identify a target device that is located on the network. The GUID is typically 64 bits with the first 32 bits being assigned to a company making the device and the other 32 bits being assigned to the device.

In one embodiment when used within a SCSI storage environment, a type field 300a may be the first two bytes of the data that would be returned by a SCSI INQUIRY command to LUN 0 of the target. Its format is defined in the SCSI specification. Another embodiment of a type field is described in further detail in reference to FIG. 8.

In this embodiment, a LUN count field 300*b* may also be included within the target information field 300. In one embodiment a LUN count field 300*b* reflects the number of LUNs directly supported by a device. If this is a LUN bridge, there may be additional levels of bridging behind this bridge as defined in the SCSI specification. While SCSI defines an eight byte LUN field, in this embodiment, only two bytes apply at any level, so two bytes may be sufficient to report the total number of LUNs at this level.

The target information field 300 may further include a re-registration interval field 300*c*. In one embodiment, the re-registration field 300*c* shows the time in seconds until a target should again register with the master initiator (i.e., send a target identify packet to the master initiator). When the target information field 300*c* is part of a target identify message, the re-registration interval field 300*c* contains the number of seconds the target would like to wait until it again registers. In one embodiment, the target is required to re-register with the master initiator to show that it is still part of the network. When the target information field is part of a master identify message, it is the time left until the target will re-register, as determined by the master initiator at the time it creates the message.

The target information field 300 may also contain a flag field 300*d* that consists of one or more bit flags that can be utilized to define any number of target information or features. In one embodiment, the flag field 300*d* includes the following exemplary bit flags (additional ones to indicate key target features may be defined in the future):

| | |
|---|---|
| 0x0001 | PDP_IP_0 |
| 0x0002 | PDP_IP_1 |
| 0x0100 | PDP_REG_TOGGLE (Used as a one bit sequence number to distinguish between successive target registrations |

In addition, the target information field 300 also contains a GUID field 300*e* which, in one embodiment, may be utilized to hold a 64 bit GUID number for a particular device or initiator connected to a network. It should be understood that the GUID field 300*e* may contain any type of identification information for any type of device on a network. By comparison of the GUID numbers, a master initiator may be selected from among a plurality of initiators. In one embodiment, the initiator with the higher (or highest) GUID number becomes the master initiator.

The target information field 300 also contains a target device ID field 300*f* which holds the address for a particular target. It should be understood that the target address field 300*f* may contain any type of target address depending on the type of network and protocol utilized for data transfer and communication such as, for example, Ethernet, TCP/IP, iSCSI, eSCSI, etc. In one embodiment, the target address field 300*f* includes a 16 byte IP address field which holds an IP address for the target in question. If IP addressing information is present, it is placed in a target device 16 byte address field and appropriate flags are set in the flag field. In one embodiment, if the target address field contains an IP address then an IP address is utilized in the target address field 300*f*. In one embodiment, if IP0 and IP1 each are a "0", this indicates that no IP address has been assigned to this target.

Figure 8:
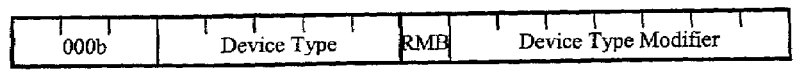
FIG. 8 shows a device type field as utilized within a target field in accordance with one embodiment of the present invention.

FIG. 8 shows a device type field 300*a* as utilized within a target field 300 in accordance with one embodiment of the present invention. It should be understood that any type of device information may be utilized within the device type field 300*a* such as, for example, information often utilized with a format as defined in the SCSI specification. The first three bits are the peripheral qualifier, where zero indicates that the logical unit (always LUN 0) is supported, which will always be the case. The Device type may also refer to LUN 0 of the target and have values specified in the following exemplary way:

| | |
|---|---|
| 0x00 | Direct-access device |
| 0x01 | Sequential-access device |
| 0x02 | Printer device |
| 0x03 | Processor device |
| 0x04 | Write-once device |
| 0x05 | CD-ROM device |
| 0x06 | Scanner device |
| 0x07 | Optical memory device |
| 0x08 | Medium changer device |
| 0x09 | Communication device |
| 0x0C | Storage Array Controller |
| 0x0D | Enclosure Services device |
| 0x1f | Unknown or no device type |

In one embodiment, initially the only device type may be a LUN bridge (type 0x1f), but future native devices (or a bridge with only one device connected) can set the type field to the appropriate value for the attached device.

Figure 9:
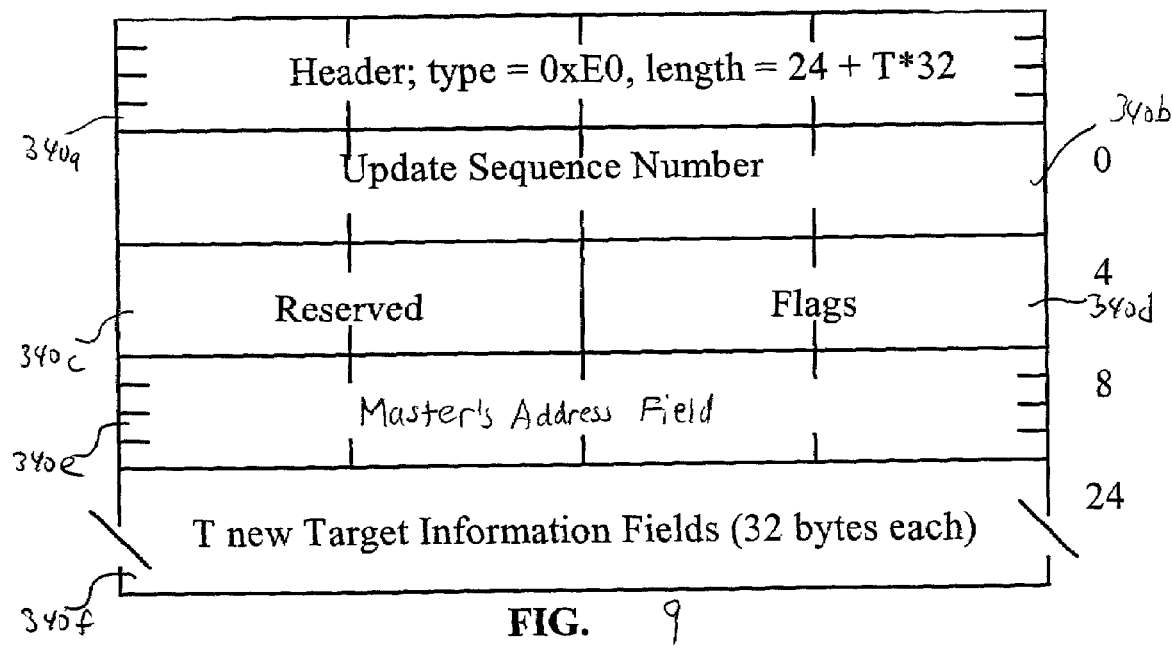
FIG. 9 shows a master identify packet in accordance with one embodiment of the present invention.

FIG. 9 shows a master identify packet 340 in accordance with one embodiment of the present invention. In one embodiment, in its role of stimulating new targets (or old targets whose re-registration interval has expired) to unicast back a target identify, the master identify packet can be considered an efficient multicast polling mechanism. In an exemplary embodiment, the master identify packet 340 includes a header field 340*a*, a update sequence number 340*b*, a reserved field 340*c*, a flags field 340*d*, a master's address field 340*e*, and a new target information fields 340*f*. The master identify packet 340 announces that an initiator believes it is a master, and what its address is (such as, for example IP address). In one embodiment, a sequence number field 340*a* may be incremented every time a new target information is transmitted with the packet. In one embodiment, if there are new targets, the target information fields from their target identify packets may be appended to the master identify packet 340. It should be understood that the present invention may multicast any number of new targets. If the present invention is utilized in an Ethernet system, up to 44 new targets can be multicast this way in a standard 1.5 KB Ethernet frame. If more than 44 have been added, they can be included in subsequent master identify packets, each with a higher sequence number. In another embodiment, an extension to Ethernet would allow 9 KB packets, or about 180 targets per master initiator In one embodiment, any given group of new targets is only multicast once, since any initiators that miss the multicast will eventually send a query packet to get the full list. The flags field may contain any combination of the following in an exemplary flag system:

| | |
|---|---|
| 0x80 | Real Master - Indicates to targets that this Master has won the Master Initiator selection process. If not set, targets should ignore any information in the message, as this is only a slave initiator trying to become a master. |
| 0x40 | Sending All Targets - The Master Initiator may decide to send a complete list of targets whether a slave initiator requests a complete list or only an update. Any time the full list is sent, this flag must be asserted. |

-continued

| | |
|---|---|
| 0x20 | Bus Reset - Indicates that the bus reset is being asserted. In one embodiment, only targets observe it and only for the purpose of releasing unit reservations. |
| 0x08 | PDP_IP_MODE<br>If set, indicates that this packet is part of the IP based Global Discovery protocol, and all MAC address fields in the target information block are invalid. |
| 0x0001 | PDP_IP_0 |
| 0x0002 | PDP_IP_1<br>The type of address information (MAC, IP v. 4, or IP v. 6) contained in the Master's Device ID field. |

Figure 10:
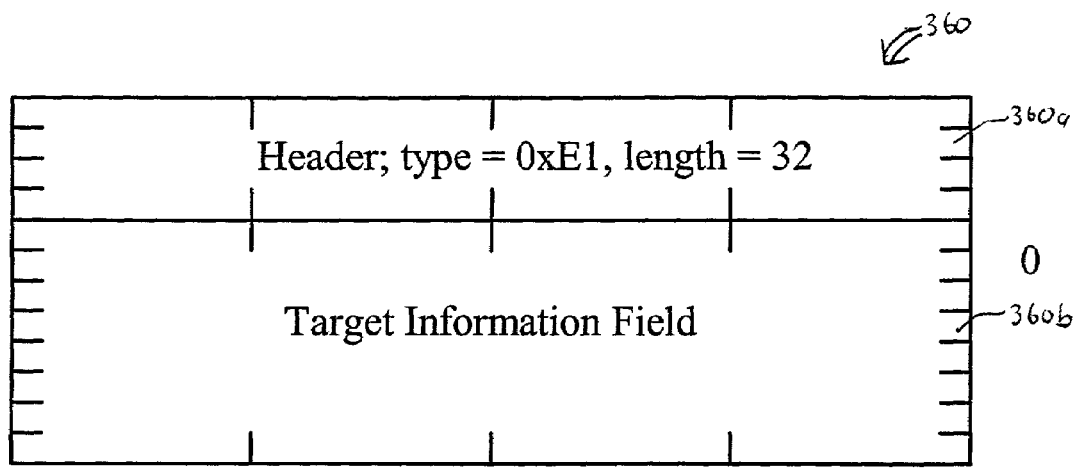
FIG. 10 illustrates a target identify packet in accordance with one embodiment of the present invention.

FIG. 10 illustrates a target identify packet 360 in accordance with one embodiment of the present invention. In one embodiment, the target identify packet 360 contains a header 360a and a target information 360b. The target identify packet 360 is sent from a target to a master initiator to register with the initiator in response to a master identify multicast. The target will continue sending target identify packets with each receipt of a master identify from the master initiator with which it is trying to register until that initiator responds with a master ACK packet with matching registration toggle flag.

A target which is not currently registered will attempt to register with the first master initiator it sees (master identify packet with Real_Master flag set). It will not respond to master identify packets from any other initiator until master initiator signals (e.g. master identify packets) from the master initiator that the target is trying to register with have been absent for a master_missing period, whether or not it has succeeded at registering with that initiator. It should be understood that the master-missing period may be any length of time which would enable the target to determine that the master initiator is either no longer connected to the network or that the target identify packet was not received by the master initiator.

Figure 11:
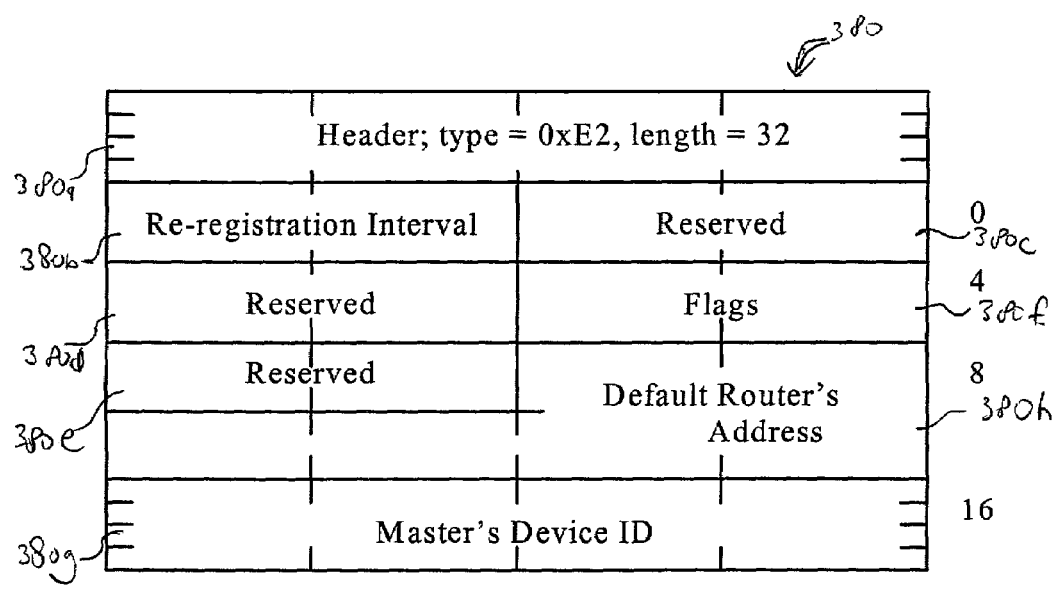
FIG. 11 depicts a master ACK packet in accordance with one embodiment of the present invention.

FIG. 11 depicts a master ACK packet 380 in accordance with one embodiment of the present invention. In one embodiment, the master ACK packet 380 includes a header field 380a, a re-registration interval field 380b, reserved fields 380c–e, a flags field 380f, a default router's address field 380h, and a master device ID field 380g. The master ACK packet 380 is sent from a master initiator to a target in response to a target identify packet and includes the required re-registration interval, some flags, and the master's address.

In one embodiment, the re-registration interval is the larger of the target's requested re-registration interval and the initiator's minimum re-registration interval. An exemplary flags field contains the following:

| | |
|---|---|
| 0x1000 | PDP_REG_TOGGLE<br>Used as a one bit sequence number to distinguish between successive target registrations |
| 0x0001 | PDP_IP_0 |
| 0x0002 | PDP_IP_1<br>The type of address information (MAC, IP v. 4 or IP v. 6) contained in the Master's Device ID field. |

Figure 12:
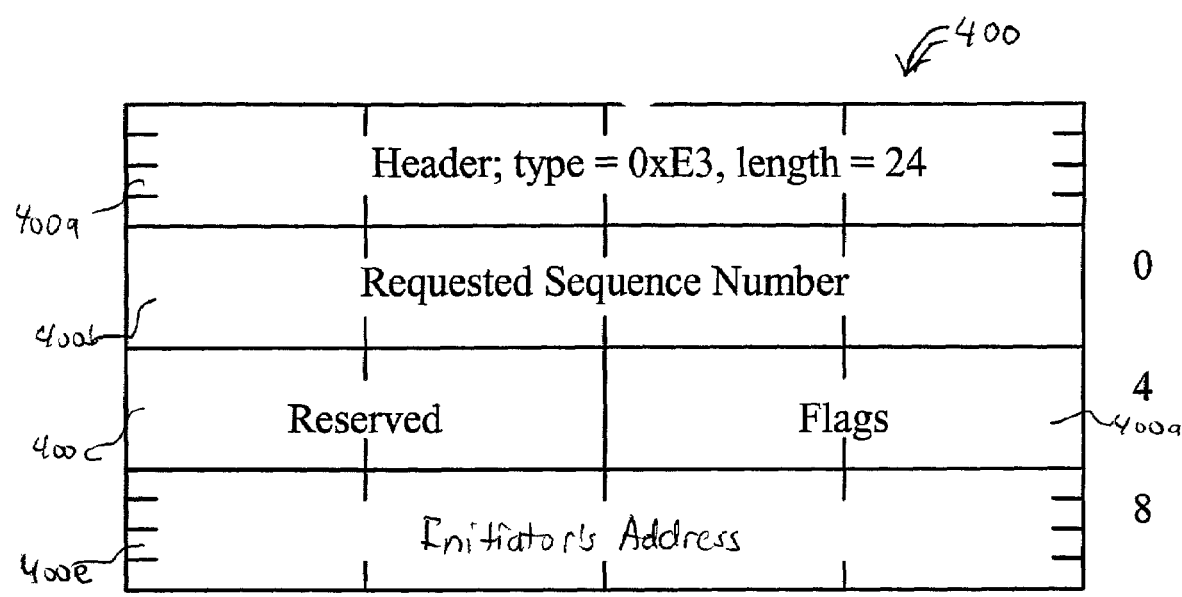
FIG. 12 illustrates a query packet in accordance with one embodiment of the present invention.

FIG. 12 illustrates a query packet 400 in accordance with one embodiment of the present invention. In one embodiment, the query packet 400 includes a header field 400a, a requested sequence number field 400b, a reserved space field 400c, a flags field 400d and requesting initiator's address field 400e. The query packet 400 is sent from a slave initiator to a master initiator to request a refresh of a slave's target list. The query packet 400 is often sent when the target realizes that it has missed a target update information due to the reception of a master initiator signal (e.g. master identify packet) with a new sequence number but without updated target information. In one embodiment, a sequence number included within the query packet 400 may be the sequence number of the last sequentially received (with update data) master identify packet. If this query is being sent from a newly detected Master Initiator, then a complete dump of the target information is requested by setting the PDP_REQ_ALL_TARGETS flag.

A query packet may also be used to request a bus reset, in which case the master initiator does not return any target information. Instead, the master initiator issues a bus reset in the next several master identify packets it sends. Exemplary flags which may be included in query packets are as follows:

| | |
|---|---|
| 0x4000 | PDP_REQ_ALL_TARGETS - The slave initiator requests a complete dump of the Master Initiator's known target list. |
| 0x2000 | PDP_REQ_BUS_RESET - Request a bus reset. |
| 0x0001 | PDP_IP_0 |
| 0x0002 | PDP_IP_1<br>The type of address information (MAC, IP v. 4, or IP v. 6) contained in the Requesting Initiator's Device ID field. |

Figure 13:
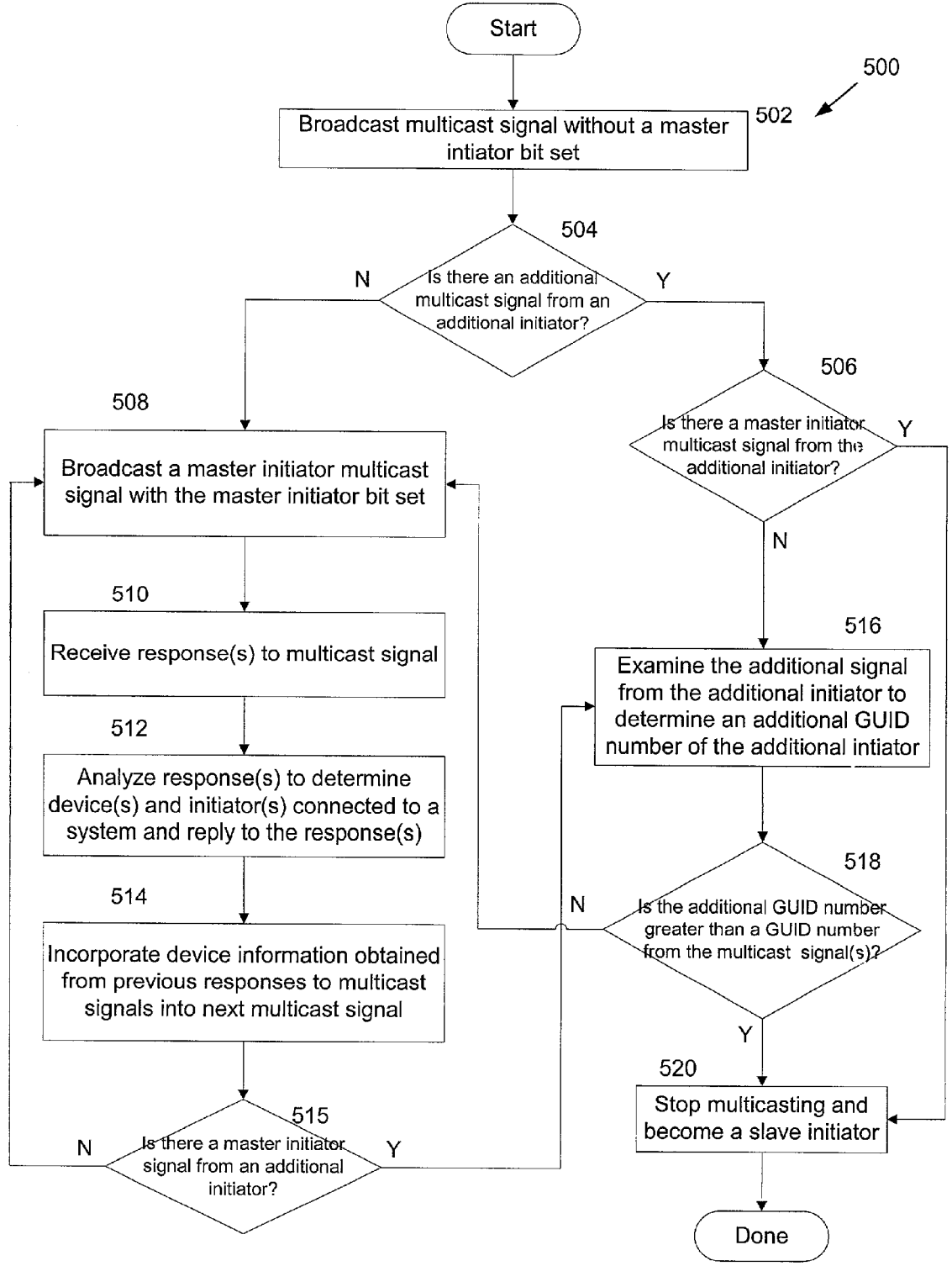
FIG. 13 shows a flowchart defining a method for determining a master initiator and obtaining target information in a network in accordance to one embodiment of the present invention.

FIG. 13 shows a flowchart defining a method for determining a master initiator and obtaining target information in a network in accordance to one embodiment of the present invention. It should be understood that the processes depicted in the flowchart 500 may be in a program instruction form written on any type of computer readable media. For instance, the program instructions can be in the form of software code developed using any suitable type of programming language. For completeness, the process flow of FIG. 13 will illustrate an exemplary process whereby a master initiator is selected and peripheral devices are detected on a network while at the same time reducing data congestion normally and decreasing device detection time associated with such a process.

In operation 502, a multicast signal is broadcasted without a master initiator bit set. It should be understood that a signal may be broadcasted in any way that allows the nodes in a network to receive the signal. It should also be understood that any mechanism similar to not setting a master initiator bit may be utilized which may notify receivers of the master initiator signals that the initiator is or is not a master initiator. In this embodiment, a master initiator bit such as a real_initiator flag is not set which shows that the signal is not from a master initiator.

After operation 502, the method proceeds to operation 504 where it is determined if there is an additional multicast signal from an additional initiator. In this operation, an initiator may monitor the network and look for multicasts from another initiator.

If operation 504 determines that there is no additional multicast signal from an additional initiator, the method moves operation 508 where an initiator broadcasting the multicast signal becomes the master initiator by default. In this operation, the master initiator starts to multicast master initiator signals with the master initiator bit set. In one embodiment, a real_initiator flag is set so other initiators and targets on the network know about the existence of a master initiator. In one embodiment, the master initiator broadcasts a master initiator multicast signal once a second.

Then, operation 510 receives response(s) to multicast signal from slave initiator(s) and/or target(s). Once the master initiator signal with the master initiator bit that is set is multicasted on the network, targets will know about the master initiator and will start to send target identification packets to the master initiator.

After operation 510, the method advances to operation 512 where response(s) are analyzed to determine device(s) and initiator(s) connected to a system and responses are sent. In this operation, the master initiator examines any target identification packets received from targets connected to the network. In addition, once the identification packets are received, the master initiator sends an acknowledgement signal to the targets. It should be appreciated that any type of acknowledgement signal may be utilized to inform the target of information such as, for example, the master initiator address, re-registration interval, etc. In one embodiment, the acknowledgement signal consists of a master ACK packet which includes the required re-registration interval, some flags, and the master's address.

If a query request is received from one or more slave initiators because certain target data was not receive, the master initiator determines what information the slave initiator is missing.

After operation 512, the method moves to operation 514 where device information obtained from previous responses to multicast signals are incorporated into a next multicast signal. In this operation, the device information from targets obtained after the last update of the master initiator signal is inputted into the next multicast signal that is outputted by the master initiator. By this updating, the master initiator may inform the network of any devices that was connected after the target update. In addition, if an expected re-registration of a particular target is not included in the update, this lack of information intelligently conveys that the particular target is no longer part of the network.

In addition, the master initiator may also receive query requests from the slave initiators. If a slave initiator receives the latest master initiator signal and finds that it has missed receiving the master initiator signal previously sent, the slave initiator sends a query request to the master initiator so the master initiator can unicast the missing data to the slave initiator. Therefore, the peripheral device discovery system may intelligently update the state of the devices attached to the network in a coherent, organized, and centralized fashion without creating congestion on the network.

After operation 514, the method progresses to operation 515 where it is determined if there is a master initiator signal from an additional initiator. If there is a master initiator signal from the additional initiator, then the method moves to operation 516 which is described below. If there is no master initiator signal from the additional initiator, the method repeats operations 508, 510, 512, 514, and 515 until the master initiator is replaced by a new master initiator which may occur in, for example, situations where two networks with two master initiators are connected to become one network. In one embodiment, if two networks are connected, the two master initiators of the two networks compare their GUID numbers and the initiator with the highest GUID number becomes the new master initiator of the combined network.

If operation 504 finds that there is an additional multicast signal from an additional initiator, the method advances to operation 506 where it is determined if there is a master initiator multicast signal from the additional initiator. In this operation, the master initiator signal received is analyzed to ascertain if a master initiator bit is set. A master initiator signal with a master initiator that is set is indicative that a master initiator already exists. In one embodiment, a bit such as a real_initiator flag may be utilized to show that there is already a master initiator.

If operation 506 determines that a master initiator bit is set in the additional master initiator signal then the method advances to operation 520 where the first initiator that broadcasted the multicast signal in operation 502 becomes a slave initiator and the additional initiator becomes the master initiator.

If operation 506 determines that the additional multicast signal is not from a master initiator then the method progresses to operation 516 which examines the additional signal from the additional initiator to determine a GUID number of the additional initiator. In this operation, the additional master initiator signal is examined to find a GUID number of the additional initiator for comparison later with a GUID number of the first initiator that sent out the multicast signal in operation 502.

After operation 516, the method advances to operation 518 where a determination is made if the GUID number of the additional initiator is greater than the GUID number from the multicast signal(s) broadcasted by the first initiator in operation 502. This operation shows a selection process that is made between multiple initiators to determine which initiator becomes a master initiator. It should be understood that any way of determining the master initiator may be utilized as long as the determination is made on a coherent, intelligent, and logical basis. In one embodiment, the determination is made by comparing GUID numbers and making the initiator with the highest GUID number the master initiator.

If operation 518 determines that the GUID number from the multicast signal is greater than the GUID number from the additional master initiator signal then the method moves to operation 508 and completes operation 510, 512, and 514.

If operation 518 determines that the additional GUID number is greater than the GUID number from the multicast signal, the method advances to operation 520 where the original initiator stops multicasting and becomes a slave initiator while the additional initiator becomes the master initiator. In another embodiment, the original initiator becomes a slave initiator, and if it has not received a master initiator signal for a certain period of time, it may automatically assume the functionality of a master initiator.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for target device discovery on a network comprising plurality of hosts, each of the hosts having a corresponding one of a plurality of initiators, the network further comprising a plurality of target devices in communication with one another, the method comprising:

identifying a master initiator from among the plurality of initiators connected to the plurality of hosts, other initiators of the plurality of initiators being at least one slave initiator;

transmitting a multicast signal from the master initiator over the network, the transmitting occurring continually at a multicast interval, the multicast signal being a signal that is sent to all nodes within the network;

transmitting a registration by a unicast signal to the master initiator, the registration being transmitted from each of the target devices connected to the network, the registration being transmitted in response to a first receipt of the multicast signal upon being connected to the network;

re-registering each target device connected to the network by transmitting a unicast signal to the master initiator, the re-registering being performed periodically at a selected re-registration interval;

determining if a previously registered target device re-registered with the master initiator;

removing the previously registered target device from a list of active target devices connected to the network when the previously registered target device has not re-registered within the selected re-registration interval, wherein the list of active target devices is maintained by the master initiator; and sending out a next multicast signal, wherein the next multicast signal includes information regarding the previously registered target device when the previously registered target device is determined to have re-registered during a current multicast interval, the current multicast interval being a period from a previous transmission of the multicast signal to the sending out of the next multicast signal.

2. The method of claim 1, wherein each of the slave initiators maintains a separate list of active targets, each of the slave initiators maintaining the previously registered target on the separate list of active targets in response to receiving the information regarding the previously registered target, each of the slave initiators removing the previously registered target from the separate list of active targets automatically when no information is received from the master initiator regarding previously registered device within the re-registration interval.

3. The method of claim 1, wherein the identifying of the master initiator comprises comparing device identification numbers of the plurality of initiators connected to the network.

4. The method of claim 1, wherein the multicast signal is in a form of a master identification packet having a sequence number, the sequence number being incremented every time new target information is transmitted with the master identification packet, the new target information including new registrations of previously unregistered target devices and re-registrations of previously registered target devices.

5. A method for target device discovery on a network, comprising:

multicasting a signal from a master initiator over a network;

determining if a previously registered target re-registered with the master initiator by a unicast to the master initiator;

removing the previously registered target on a list of active targets connected to the network when the previously registered target has not re-registered within a selected re-registration interval; and sending out a next multicast, wherein the next multicast includes information regarding the previously registered target when the previously registered target is determined to have re-registered since the multicasting of the signal, the information regarding the previously registered target notifying other initiators to maintain the previously registered target on the list of targets; and causing a second initiator, in response to receiving a third multicast, the third multicast not including the information regarding the previously registered target, to compare a sequence number of the third multicast with a previous sequence number of a previous multicast, the previous multicast being a most recently received multicast prior to the third multicast.

6. A method for target device discovery on a network as recited in claim 5, wherein the second initiator determines that a multicast has been missed when the difference between the sequence number of the third multicast and the previous sequence number is greater than one and target information is included in the third multicast, the second initiator also determining that a multicast has been missed when the difference between the sequence number of the third multicast and the previous sequence number is equal to one and the third multicast does not include target information.

7. A method for target device discovery on a network as recited in claim 6, further comprising causing the second initiators to request target information contained in the second multicast when the second initiator determines that a multicast has been missed.

8. The method of claim 1, wherein the network is one of an iSCSI network, an eSCSI network, a TCP/IP network, and an Ethernet network.

9. The method of claim 1, wherein the next multicast transmission does not include information regarding the previously registered target device when the master initiator removes the previously registered target device from the list of active target devices.

10. A method for target device discovery on a network having a plurality of hosts and a plurality of target devices in communication with one another, each of the plurality of hosts having an initiator, the method comprising:

identifying a master initiator as one of the plurality of initiators, each of the plurality of initiators being either a master initiator or a slave initiator;

transmitting a multicast signal from the master initiator over the network;

receiving, at the master initiator, a unicast signal from a new target device recently connected to the network;

adding the new target device to a master list of target devices connected to the network, the master list of target devices being maintained by the master initiator;

sending out a next multicast signal, the next multicast signal being received by the slave initiators, the next multicast signal including information regarding the new target device; and adding the new target device to a separate list of target devices at each slave initiator such that each slave initiator is made aware of all of the target devices currently connected to the network.

11. A method for target device discovery on a network as recited in claim 10, wherein the network is one of an iSCSI network, an eSCSI network, a TCP/IP network, and an Ethernet network.

12. A method for target device discovery on a network as recited in claim 10, wherein the master initiator is identified from among the plurality of initiators by comparing device identification numbers of the plurality of initiators connected to the network.

13. A method for target device discovery on a network as recited in claim 12, wherein the device identification number is a global unique identification (GUID) number.

14. A method for target device discovery on a network as recited in claim 10, wherein the signal from the master initiator is in a form of a master identification packet having a sequence number, the sequence number being incremented every time new target information is transmitted with the master identification packet, the new target information including new registrations of previously unregistered target devices and re-registrations of previously registered target devices.

15. A method for target device discovery on a network, comprising:

multicasting a signal from a master initiator over the network;

receiving a unicast from a new target recently connected to the network;

adding the new target to a list of targets connected to the network;

sending out a next multicast to other initiators, the next multicast including information regarding the new target; and causing a second initiator, in response to receiving a third multicast from the master initiator, the third multicast not including the information regarding the new target, to compare a sequence number of the third multicast with a previous sequence number of a previous multicast, the previous multicast being a most recently received multicast prior to the third multicast.

16. A method for target device discovery on a network as recited in claim 15, wherein the second initiator determines that a multicast has been missed when the difference between the sequence number of the third multicast and the previous sequence number is greater than one and target information is included in the third multicast, the second initiator also determining that a multicast has been missed when the difference between the sequence number of the third multicast and the previous sequence number is equal to one and the third multicast does not include target information.

17. A method for target device discovery on a network as recited in claim 16, further comprising causing the second initiator to request target information contained in the next multicast when the second initiator determines that a multicast has been missed.

18. A method for target device discovery on a network as recited in claim 10, further comprising sending additional multicast signals on a periodic basis, the additional multicast signals not including the information regarding the new target device.

19. A method for target device discovery on a network, the method being implemented by a master initiator, the master initiator including logic for implementing the method, the method comprising:

transmitting a plurality of multicasts over the network, the multicasts being transmitted continually at a predetermined interval;

in response to receiving a unicast from a new target device recently connected to the network, adding the new target device to a list of target devices;

in response to determining that a previously registered target device re-registered with the master initiator, maintaining the previously registered target device on the list of target devices;

wherein one of the multicasts includes new target device information regarding the maintaining and the adding of target devices to the network; and wherein each multicast has a sequence number, the sequence number being incremented every time the new target information is included in the multicast.

20. A method for target device discovery on a network as recited in claim 19, wherein the previously registered target re-registers by unicasting information to the master initiator on a periodic basis.

21. A system for target device discovery on a network comprising:

a master initiator, the master initiator configured to periodically transmit a multicast signal throughout the network at a predetermined interval;

at least one target device, the at least one target device being configured to remain passive until one of the multicast signals is received from the master initiator, the at least one target device being further configured to transmit a unicast response to the master initiator upon first receiving one of the multicast signals, the unicast response including an address of the at least one target device, the at least one target device further being configured to periodically re-register with the master initiator at a re-registration interval; and at least one slave initiator, the at least one slave initiator configured to receive target information from the multicast signals.

22. A system for target device discovery on a network as recited in claim 21, wherein the at least one slave initiator is configured to unicast to the master initiator a request to resend information if a multicast with updated target information was not received by the at least one slave initiator.

23. A system for target device discovery on a network as recited in claim 22, wherein the at least one slave initiator is configured to determine if the multicast with updated target information was not received by examining a sequence number of each multicast to determine if a previous multicast was missed.

24. A system for target device discovery on a network as recited in claim 23, wherein the previous multicast was missed when a last sequence number from a last multicast has incremented and no updated target information has been received.

25. A system for target device discovery on a network as recited in claim 21, wherein the network is one of an iSCSI network, an eSCSI network, a TCP/IP network, and an Ethernet network.

* * * * *